United States Patent [19]
Fujio

[11] 4,290,992
[45] Sep. 22, 1981

[54] HEAT-SHRINKABLE FILM TUBE WITH AN INTERNALLY RIBBED CLOSED END, AND A METHOD OF MAKING IT

[75] Inventor: Masaaki Fujio, Suita, Japan

[73] Assignee: Fuji Seal Industry Co., Ltd., Osaka, Japan

[21] Appl. No.: 73,068

[22] Filed: Sep. 6, 1979

[30] Foreign Application Priority Data

Sep. 28, 1978 [JP] Japan ............................ 53-118615

[51] Int. Cl.³ ............................................. B29C 27/00
[52] U.S. Cl. .................................. 264/163; 264/230; 264/296
[58] Field of Search .................. 264/230, 296, 163

[56] References Cited

U.S. PATENT DOCUMENTS

| 3,177,278 | 4/1965 | Schilling | 264/296 X |
| 3,336,430 | 8/1967 | Cech | 264/296 |
| 4,108,347 | 8/1978 | Amberg | 264/230 X |
| 4,115,173 | 9/1978 | Qualey | 264/296 X |

FOREIGN PATENT DOCUMENTS

2026427 12/1971 Fed. Rep. of Germany ...... 264/296

*Primary Examiner*—Thomas P. Pavelko
*Attorney, Agent, or Firm*—Daniel M. Rosen

[57] ABSTRACT

A method for forming a closed end on a tube of heat-shrinkable film wherein the tube is placed over a cylindrical mold with one end of the tube extending beyond top end of the mold, includes forming a pattern of grooves in the mold's top end, and then heating the tube so that it shrinks and tightly contacts and covers the grooved end of the mold. Excess film protruding from the end of the tube which has shrunk against the grooved end of the mold is cut off or folded down and then this end of the tube is pressed with a heated smooth plate against the grooved end of the mold. Excess film material remaining on this end portion of the tube is squeezed into the grooves, whereby the end of the film tube is formed with a uniform thickness and with low thermal stresses thereby reducing any tendency for distortion of the closed end and providing a surface that can be more easily printed on.

7 Claims, 9 Drawing Figures

HEAT-SHRINKABLE FILM TUBE WITH AN INTERNALLY RIBBED CLOSED END, AND A METHOD OF MAKING IT

BACKGROUND OF THE INVENTION

This invention relates to a method for forming a closed end on a tube of heat-shrinkble film, and also to a closed end tube formed by the method.

In conventional methods for forming a tube of heat-shrinkable film, such as a thermoplastic resin film with a closed end, a piece of heat-shrinkable film tube is placed over a cylindrical mold which has a generally planar top end, with part of the tube extending above the top end. The tube is then heated, so as to shrink it, so that the part extending above the top end of the mold contracts considerably and conforms roughly thereto. Then this part is pressed against the top end of the mold by a heated plate. Thereby the end of the closed tube is flattened and positively sealed. This can be used for forming a container, a cap, a cap seal, or the like.

However, this prior art method has several defects described as follows.

(1) Since, prior to the pressing by the heated plate, the top portion of the tube is folded up on the flat mold top, especially towards the center thereof, high pressure must be exerted by the heated plate in order to form a tube end of uniform thickness, and in practice this tube end tends not to be uniform, especially towards its center.

(2) Excess melted film squeezed out from between the heated plate and the top surface of the mold tends to drip down the sides of the tube during the pressure stage of the process, and this results in a finished article of poor appearance. This is particularly noticeable because the pressure applied to the heated plate has to be high, as explained with reference to reason (1).

(3) Since, as explained with reference to reason (1), the closed end of the finished product tends to be of non-uniform thickness, and since it is formed while being heated, the finished article may be distorted during the cooling of the film.

(4) For reasons (1) and (3), it is difficult to print on the outer surface of the closed end.

(5) After cooling, the parts of the closed end where the melted resin has flowed substantially in the radial direction sometimes crack.

SUMMARY OF THE INVENTION

It is an object of the present invention to provide a method of making a tube of heat-shrinkable film with a closed end, which avoids the disadvantages described above with respect to the prior art. Another related object of the present invention is to provide a tube of heat-shrinkable film with a closed end, which is smooth has generally uniform thickness, is not distorted and is not likely to crack.

The present invention will become more clearly understood with reference to the followng description of several preferred embodiments thereof, and with reference to the accompanying drawings. It should be clearly understood, however, that the descriptions of the embodiments, and the drawings, are given for the purposes of elucidation and explanation only, and are in no way intended to limit the scope of the present invention, or of the scope of the claims herein.

DESCRIPTION OF THE PREFERRED EMBODIMENTS

Figure 1:
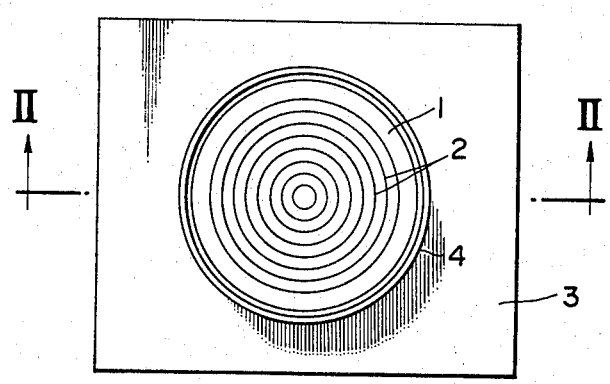
FIG. 1 is a top or end view of a piece of heat-shrinkable film on a cylindrical mold according to the present invention, before it is heated so as to shrink it.

Referring now to the drawings, in which like reference numerals denote corresponding parts in the several figures, there is shown a cylindrical mold 1 which is slightly tapered towards its top end as seen in the figures. The top end of this mold 1 is formed with a pattern of concentric circular grooves 2, and its bottom is fixed on a stand plate 3.

Figure 2:
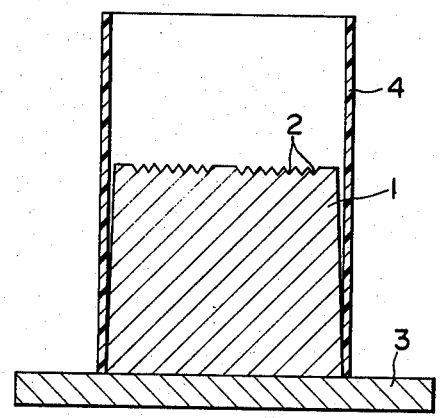
FIG. 2 is a cross-sectional view, taken along the line II—II in FIG. 1.
Figure 3:
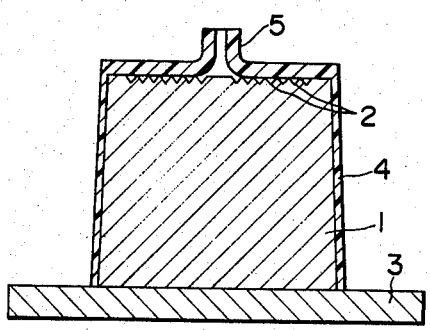
FIG. 3 is a view similar to FIG. 2, showing the film after it has been shrunk by heat.

A heat-shrinkable film tube 4 has length which is longer than the height of the mold 1 so that it may cover substantially the entire top end of the mold 1 when it is shrunk by heating, as hereinafter described. In this embodiment the tube is made of thermoplastic resin which is fitted over the mold 1 as shown in FIG. 2. The tapering of the mold 1 facilitates this placement of the tube on the mold. Then the tube 4 is heated, so that it shrinks, and thereby it tightly contacts to the mold 1, and the top end of the tube 4 is shrunk against the top end of the mold, as shown in FIG. 3, with a part protruding in the middle.

Figure 4:
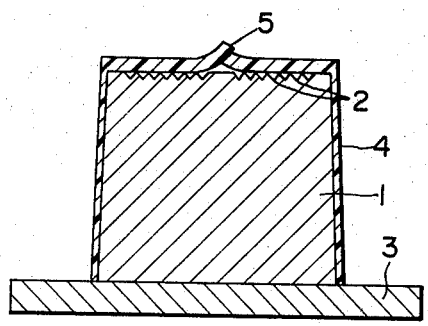
FIG. 4 is a view similar to FIGS. 2 and 3, showing the end of the shrunk tube folded down against the mold.
Figure 5:
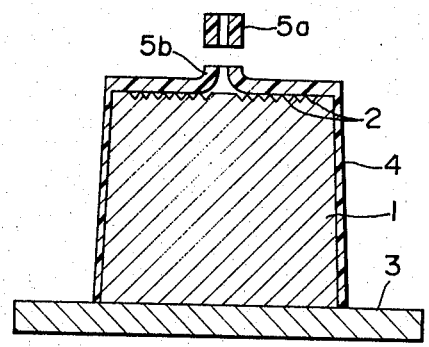
FIG. 5 is a view similar to FIGS. 2, 3, and 4, showing the end of the shrunk tube cut off.

This protruding part either is folded down against the rest of the film which covers the top end of the mold, as shown in FIG. 4, or is cut off to form a removed part 5a, the other part of it 5b being pushed against the mold, as shown in FIG. 5.

Figure 6:
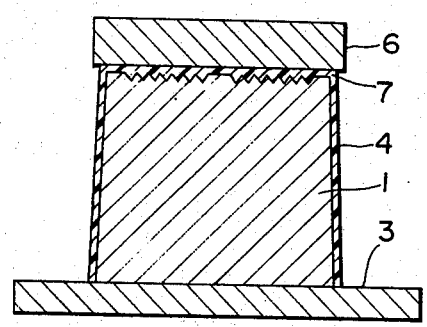
FIG. 6 is a view of the next stage in the process, similar to FIGS. 2–5, showing a heated plate pressing the closed end of the film tube.

Next, a smooth heated plate 6 is pressed against the top end of the mold, pinching the film between it and the top end. This film is then softened and/or melted, and, because the top end of the mold is formed with the grooves 2, the excess melted resin flows into these grooves 2, as shown in FIG. 6. Therefore, high pressure is not required for the molding, and substantially no radial flowing of the film material occurs.

Figure 7:
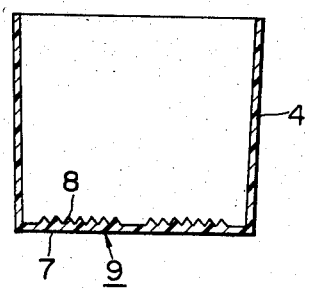
FIG. 7 is a central longitudinal cross-section of a tube of heat-shrinkable film with a closed end, according to the present invention.

Then, finally, the tube with its closed end 7 is cooled and released from the mold. The final article which results is shown in FIG. 7. The pattern of circular ribs 8 on the inside of the closed end, which has been formed from the grooves 2, serves to reinforce the end. Further, since the excess material which was present at this end has flowed into the grooves 2 and has formed the ribs 8, low thermal stresses have been set up in the end 7, and therefore the smooth outer surface 9 which has been formed by the pressure of the heated plate 6 remains smooth, so that it can easily receive printing. The formation of cracks around the periphery of the end 7 is also substantially inhibited. Also, dripping of molten film material down the sides of the film tube is eliminated.

Figure 8:
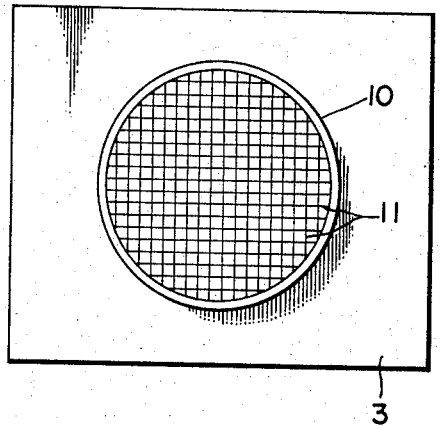
FIGS. 8 and 9 are top views of other cylindrical molds which may be used for the practice of the present invention.
Figure 9:
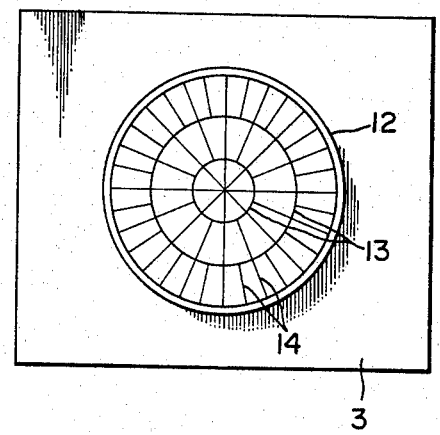

FIGS. 8 and 9 show alternative forms 10 and 12 for the upper end of the mold 1. The mold 10 has a square mesh or grid of intersecting grooves 11 on it defining a plurality of rectangles. The mold 12 has a combination of radial grooves 14 and circular grooves 13. Other forms could of course be envisaged.

Although in the preferred embodiment shown the mold has a substantially planar end (apart from the grooves 2), this is not essential for the present invention. Nor is it necessary that the heated plate 6 should be smooth, although it is preferred. Of course, other changes and alterations could be made to the form and the content of any particular embodiment, without departing from the scope of the present invention, which it is desired should not be limited to these, however, or mere and simple generalizations, or other detailed embodiments; yet further modifications could of course be made. Therefore, the scope of the present invention should be determined by the appended claims.

I claim:

1. In a method for closing the end of a tube of heat shrinkable film which is placeable over a cylindrical mold, the improvement comprising the steps:
   a—forming grooves in the surface of a first end of said cylindrical mold,
   b—positioning said mold within said tube so that a portion of the tube extends beyond said first end,
   c—heating and thereby causing said tube to shrink until an end part of the tube covers substantially entirely the first end of said mold with a protruding part of the tube extending outward from said end part thereof,
   d—pressing said shrunk end part and protruding part against said grooved first end of the mold with a heated smooth plate, thereby causing the film of said shrunk end part and protruding part to flow until the film adjacent said grooved surface conforms generally thereto, and the outer surface of said pressed film is generally smooth, and
   e—cooling said tube and removing it from said mold.

2. A method according to claim 1 comprising the further step of cutting and removing at least a portion of said protruding part of said shrunk tube before said step of pressing said shrunk tube.

3. A method according to claim 1 comprising the further step of folding said protruding part down against said shrunk end part before said step of pressing said shrunk tube.

4. A method according to claim 1 comprising the further step of forming said first end of said mold to be generally planar.

5. A method according to claim wherein said step of forming said grooves comprises forming said grooves to define a pattern of concentric circles.

6. A method according to claim 1 wherein said step of forming said grooves comprises forming said grooves to define a pattern of intersecting lines forming a grid of rectangles.

7. A method according to claim 1 wherein said step of forming said grooves comprises forming said grooves to define a pattern of concentric circles intersected by radial lines.

* * * * *